June 23, 1970
JAMES E. WEBB
ADMINISTRATOR OF THE NATIONAL AERONAUTICS
AND SPACE ADMINISTRATION
METHOD AND APPARATUS FOR CONTROLLABLY HEATING FLUID
Original Filed Sept. 18, 1963
3,517,162
3 Sheets-Sheet 1
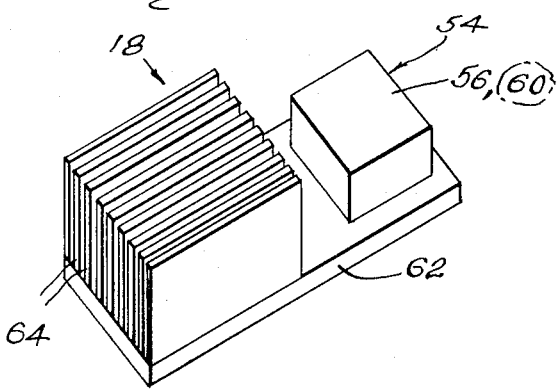
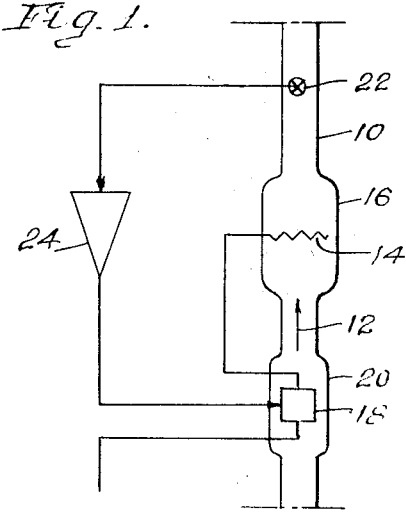
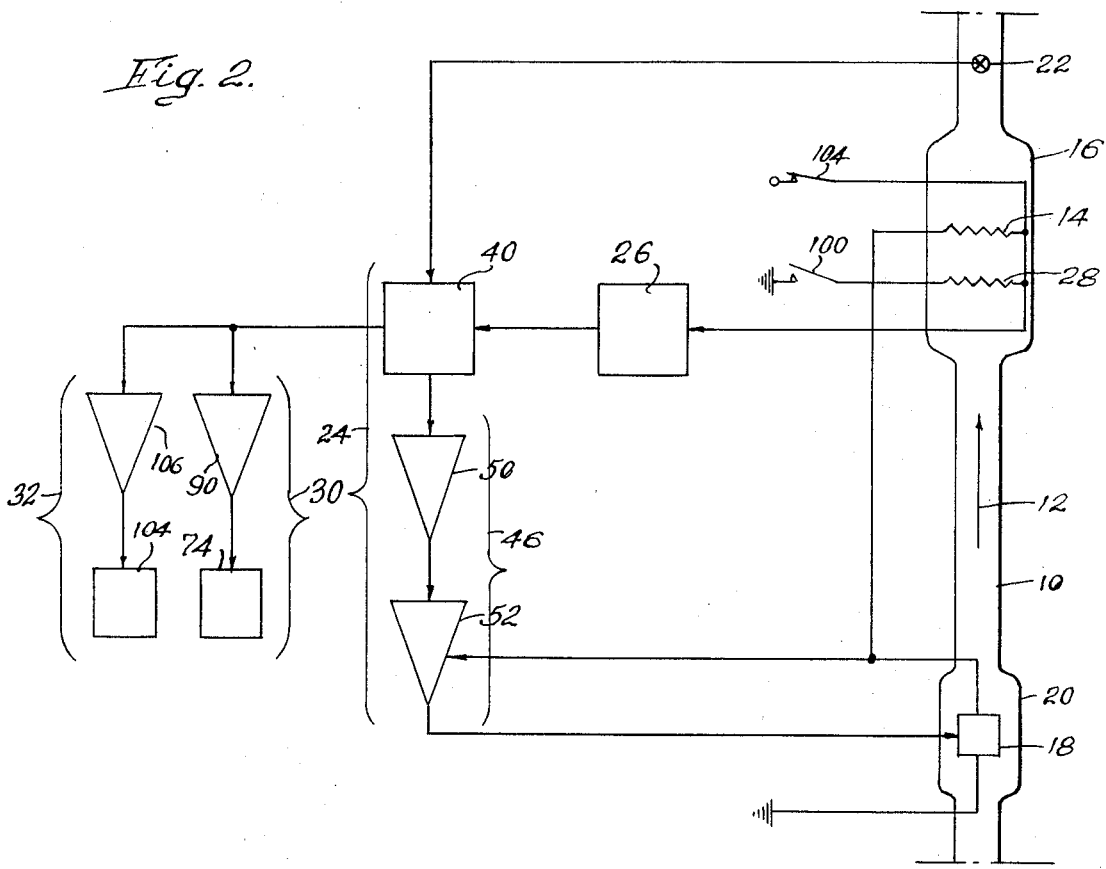
Inventor:
Thomas E. Carlisle
Edward J. Flannery
By [signature] A. Witt
Att'y

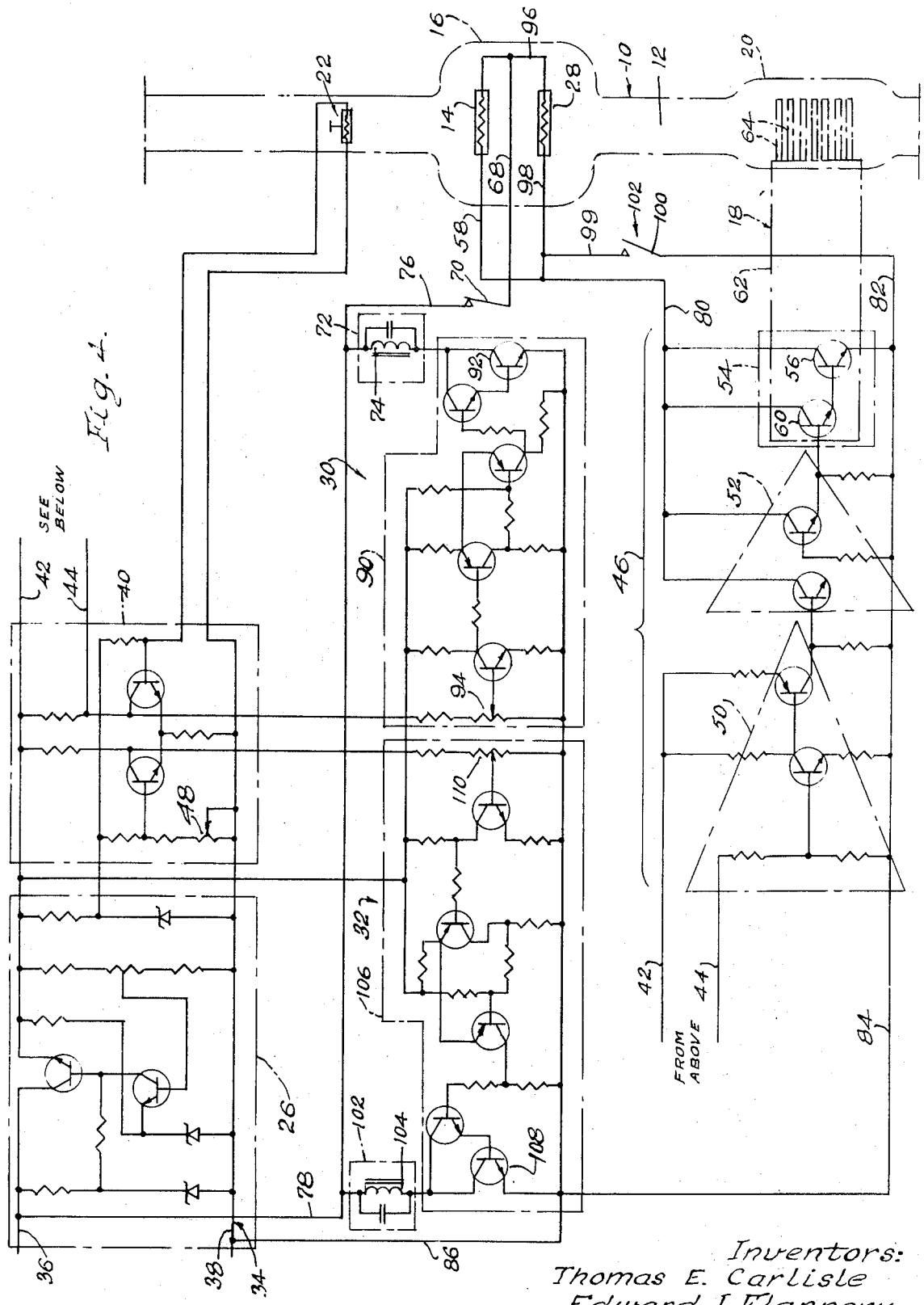

June 23, 1970 JAMES E. WEBB 3,517,162
ADMINISTRATOR OF THE NATIONAL AERONAUTICS
AND SPACE ADMINISTRATION
METHOD AND APPARATUS FOR CONTROLLABLY HEATING FLUID
Original Filed Sept. 18, 1963      3 Sheets-Sheet 3

Inventors:
Thomas E. Carlisle
Edward J. Flannery
By
Atty

United States Patent Office 3,517,162
Patented June 23, 1970

3,517,162
METHOD AND APPARATUS FOR CONTROLLABLY HEATING FLUID
James E. Webb, Administrator of the National Aeronautics and Space Administration, with respect to an invention of Thomas E. Carlisle and Edward J. Flannery, both of Cook, Ill.
Substitute for abandoned application Ser. No. 309,781, Sept. 18, 1963. This application Feb. 9, 1966, Ser. No. 539,237
Int. Cl. H05b 1/02
U.S. Cl. 219—364       16 Claims

ABSTRACT OF THE DISCLOSURE

A method and apparatus for achieving high efficiency and power economy in a fluid heater in a conduit by placing the control for heat generation in the fluid to be heated, upstream from the heating means, thereby utilizing the heat generated in the control means for preheating the fluid anterior to the principal heating means. The circuitry includes an under-temperature control and auxiliary heater for preventing underheating and an over-temperature control for preventing overheating of the fluid stream.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates to a method of controlling the heating of fluid and to an apparatus capable of carrying out the method.

Fluid heating devices which operate by circulating fluid past a heater in a conduit are well known in the prior art. Thermostatic controls are also known for use on such heating devices for turning on or turning off the heater. Such heating devices are sometimes equipped with fans or blowers for the purpose of controlling the flow of fluid past the heater and thereby controlling the heat furnished by the heating device. However, controlling the output of a heating device by the use of a fan is inefficient in that a certain amount of heat energy which is generated by the heater is wasted and not utilized at the delivery point outside the conduit.

In the past, it has sometimes been the practice to locate a thermostatic control in a conduit but to locate the related circuitry outside the conduit where the heating takes place. Modern control circuits are electronic and contain components which generate heat in the process of performing their control function. Even in transistorized control circuits, a substantial amount of heat is generated in the final amplifier stages.

Therefore, an object of the invention is to provide apparatus and method of the character indicated by which the fluid may be heated with greater efficiency than has been possible heretofore, by placing the control means in the fluid to be heated, upstream from the heating means, thereby utilizing the heat generated in the control means for preheating the fluid anterior to the principal heating means.

Another object is to utilize the heat generated by the heated control means for preheating the fluid stream, and thereby prevent that heat from affecting the apparatus ambient thereto, which would occur if the control means were not in the fluid stream.

Additional and ancillary objects are to include additional means for preventing underheating and overheating of the fluid stream relative to the normal range of heating provided by the main heating means and the control means therefor.

These and other objects are accomplished in the instant invention in which there is provided a fluid conduit having a section containing main and auxiliary heating elements, a control upstream from the heater elements, and a heat sensing element downstream from the heater elements. The heat sensing element is connected to, and is functionally part of, a bridge amplifier, which develops a control signal which is amplified and fed to the upstream control. The control in turn operates the main heater. The purpose of the control element being physically located in the conduit is to utilize the heat generated in the transistors of the final amplifier stage of the control to preheat the fluid in the conduit, thus reducing the amount of heat required to be furnished by the main and auxiliary heaters.

The device also includes an over-temperature control for turning off the main heater when the temperature at the heat sensing element exceeds a certain preset value, and an under-temperature control to turn on the auxiliary heater when the temperature at the heat sensing element drops below a certain preset level.

The invention will be more fully understood from the following detailed description taken in conjunction with the accompanying drawings in which:

FIG. 1 is a diagram of the basic components of the apparatus embodying the broad concept of the invention;

FIG. 2 is a diagram including the components of FIG. 1, but with added components forming ancillary features of the invention;

FIG. 3 is a perspective view, partially diagrammatic, of a component of the means for controlling the main heat generating means;

FIG. 4 is a diagram of a complete electric circuit utilized in apparatus embodying the invention;

Figure 5:
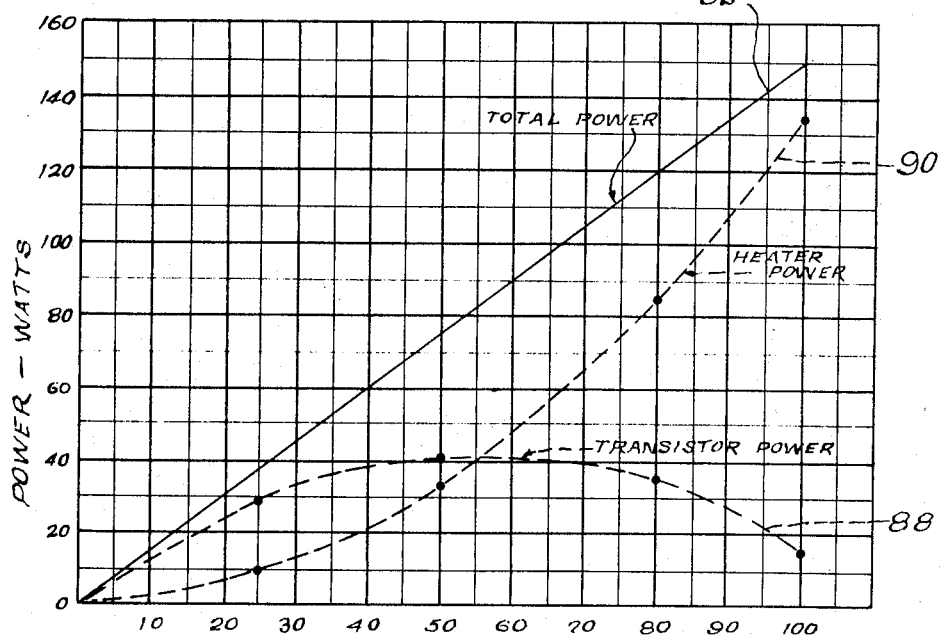
FIG. 5 is a graph showing the total heating power developed in the apparatus.

The apparatus is effective for controllably heating a fluid, i.e., a gas or a liquid, or any flowing material. While the particular application of the invention, as described in detail herein, involves controllably heating a stream of air or gas, it is to be understood that the invention is not limited to a gas. The specific disclosure herein involves electrical apparatus, which, in at least certain applications, is more flexible than other kinds of apparatus, but the concept of the invention is sufficiently broad to cover other than electrical forms of apparatus.

Referring in detail to the drawings, attention is directed first to the diagrammatic illustration of FIG. 1, which includes the components of the apparatus embodied in the basic concept of the invention. A conduit is indicated at 10 for the flow of an air stream therethrough, which, as arbitrarily assumed in the present instance, is upwardly, as indicated by the arrow 12. The air may be forced through the conduit by any suitable means (not shown) and its designation and end use may be as desired.

The air is heated directly by a main heater element 14 positioned in a heater chamber 16 formed in the conduit. The heater element 14 is regulated by a control 18 having a heat sink plate 62 positioned in a heat sink chamber 20 formed in the conduit 10. The control 18 is thus disposed directly in the air stream, upstream from the heater element 14, and serving a preheating function.

The control 18 is actuated by means including a heat sensing element 22 disposed in the air stream, downstream from the heater element 14. The signal produced by the sensing element 22 is amplified by an amplifier 24 and transmitted to the control 18 for in turn controlling the heater element 14 for maintaining the desired constant temperature of the air stream.

The diagram of FIG. 2 includes all of the components of FIG. 1, together with additional details of certain of those components, and with additional components. The conduit, the heater element, the control, and the sensing means, referred to in connection with FIG. 1, are included in this diagram. The amplifier 24, referred to in connection with FIG. 1, as illustrated in the present figure, includes three different subcomponents which will be described in detail hereinbelow. Also included in FIG. 2 is a voltage regulator 26. The main heater element 14 is accompanied by an auxiliary heater element 28, which is also located in the heater chamber 16.

As refinements in the apparatus, auxiliary heating means is provided for quickly bringing the air stream up to the desired temperature after which it cuts out, this means being indicated as a whole at 32, and including the auxiliary heater element 28. Additionally, means is provided for cutting out the main heating means in the event that the air stream should become heated to too high a temperature, this latter means being indicated as a whole at 30.

Attention is now directed to FIG. 4 showing in detail an operative electrical circuit embodying all of the components referred to above. A line source 34 includes lead-in conductors 36 and 38, which, in the specific embodiment herein shown and described, is a D.C. source of approximately 22–32 volts. Interposed in the circuit is the voltage regulator 26 referred to above, which, as shown in FIG. 4, incorporates the various elements normally utilized in a voltage regulator. The voltage regulator may be of any known type and a description of the details thereof is not necessary in this instance.

The circuit includes a bridge amplifier 40 which may also be of known type. The heat sensing element 22 referred to above and also included in FIG. 4, forms one leg of this bridge amplifier. The heat sensing element 22 in itself may be of known type and includes an element sensitive to temperature changes of the air stream, and in response thereto, produces a greater or lesser current. The resulting imbalance is sensed or felt in the bridge amplifier 40 which amplifies and transmits controlling signals through the conductors 42 and 44 which lead to a proportional control amplifier means designated in its entirety at 46 (bottom of FIG. 4) which is made up of a plurality of subcomponents to be described in detail hereinbelow. The bridge amplifier 40 includes a potentiometer 48 for adjustably setting the point at which the sensing element produces the desired controlling signal.

The signals transmitted from the bridge amplifier are again amplified by the proportional control amplifier 46, which includes three subcomponents, 50, 52 and 54, each of which in itself is conventional amplifying means of known type. These amplifying means or subcomponents operate in stages for increasing the amplification of the signals. It will be noted that the various amplifying components incorporate transistors therein in a known amplifying arrangement, and the last of these transistors, namely, 56, transmits the signals to and directly controls the operation of the main heater element 14, through a conductor 58 and other portions of the circuit to be referred to again hereinbelow. The amplifier 54 includes another transistor, namely, 60. The transistor 56, and if desired, the next preceding transistor 60, are disposed in the air stream, either directly or indirectly in such a way as to dissipate into the air stream the heat generated by those transistors in their function of controlling the heater element 14.

Attention is directed to FIG. 3, showing the control 18, at least partially semidiagrammatically; it includes the transistor 56 secured to a heat sink plate 62 of high heat conductive characteristics. If desired, the transistor 60 may also be mounted on the plate 62. The mechanical construction of the transistors, and the manner of securing them to the plate, may be as desired. Mounted also on the plate 62 in good heat conducting contact therewith, are a plurality of heat sink fins 64, also of high heat conductive characteristics. This unit or assembly of FIG. 3, embodying the control 18, may be placed bodily in the conduit 10, as indicated in FIG. 1, or the fins 64 in the conduit and the other portions exteriorly thereof, as indicated in FIG. 4, the consideration being high heat transfer relation between the transistors and the air stream, made effective by the air flowing in contact with the fins.

Referring again to FIG. 4, the heater element 14 which may include simply an electrical heating element, is connected on one side to the conductor 58 referred to above and on the other side to a conductor 68. The conductor 68 leads to a normally closed switch 70, incorporated in a relay 72, the coil of which is shown at 74. The switch 70 is connected with another conductor 76 leading to another conductor 78 which in turn is connected with the lead-in conductor 36. The circuit through the heater element 14 is completed in the opposite direction from the conductor 58 to a conductor 80 through the transistor 56, which constitutes the direct heater controlling means, then to conductors 82, 84 and 86, the last one of which is connected with the other lead-in conductor 38.

In the operation of the apparatus, and assuming a cold condition, the apparatus is turned on, and in the condition of the circuit as shown in FIG. 4, the current is enabled to pass through the end transistor or controlling element 56, and through the main heater element 14. This heater element thereupon conducts and heats up, and the heat generated thereby is dissipated into the air stream in the normal operation thereof. As the air stream warms up. It is sensed by the sensing element 22, and the current passing through the sensing element is varied, in accordance with the inherent characteristics of that element. This variation in current produces an unbalanced condition in the bridge amplifier, as referred to above, and a signal is thereby produced which is amplified by the proportional control amplifying means 46. The final signal imposed on the transistor 56 correspondingly affects the main heater element 14 so as, in the case of increasing heat, to reduce the heating effect of that heater element.

The positioning of the control means effectively in the air stream and the consequent preheating of the air stream produces an unusually high degree of efficiency. The heat generated by such a control means in apparatus heretofore known was dissipated to the external surroundings with consequent serious loss. That same heat so dissipated to the external surroundings is now dissipated to the air stream, and serves to pre-heat it so as to require less heating by the heater element 14. Attention is directed to FIG. 5, which represents the absolute power in watts, and the percentage power. The power of the transistor 56 is represented by the curve 88, while the power of the heater element 14 is represented by the curve 90. The resultant curve 92 represents the total power of the two components, namely, the transistor and the heater element. A remarkable increase in total power is indicated at the 50% point, where the heater power is shown to be about 33 watts, while the total power is about 75 watts, or more than twice the value of the heater power alone.

Figure 6:
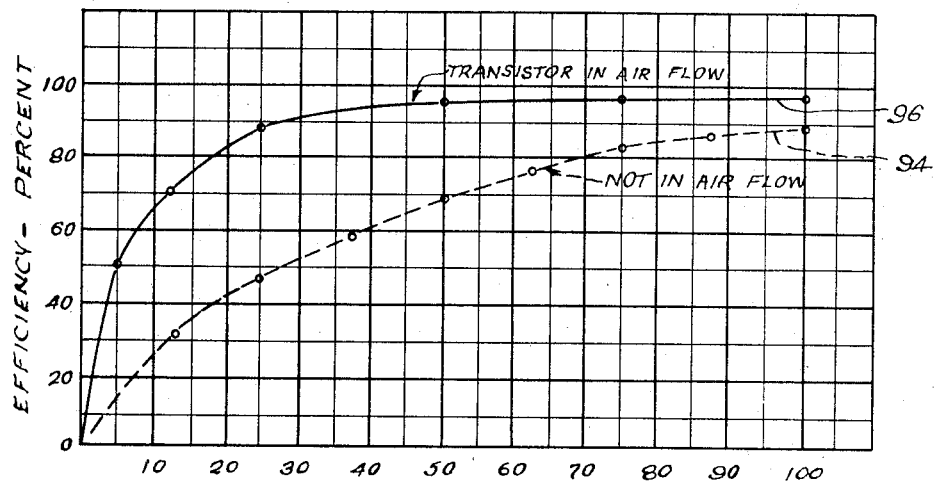
FIG. 6 is a graph showing the efficiency percentage in heating of the apparatus.

FIG. 6 is a graph showing the efficiency of the arrangement in percentage, where it will be seen at the same 50% power position, the efficiency rises from about 68% to about 96% as compared with the controlling element not in the air stream on one hand, and in the air stream on the other hand, as represented by the graphs 94 and 96, respectively. The advantages are greatest in the mid-range of operation of the heater element, this portion of the range being desirably used so as to provide greatest flexibility in control thereof.

Another advantage of the arrangement is that, in addition to improved efficiency, it eliminates the dissipation of the heat from the control means 54 to the ambient surroundings, which in many circumstances is serious from the standpoint of accuracy in precision control conditions.

In order to provide against runaway overheating in critical heating conditions, and to provide safety precaution against defects such as short circuits, etc., and such as may be serious in high accuracy conditions, means is provided for cutting out the heater element 14 if the temperature of the air stream should exceed a predetermined dangerous level. This means referred to above as the over-temperature control 30 is also included in the circuit of FIG. 4 and includes the relay 72 and a relay driver 90. The over-temperature relay driver 90 includes amplifying means operative for amplifying signals produced by the sensing element 22, and transmitted by the bridge amplifier 40 and is operative upon the final signal current passing through the last stage or transistor 92 for energizing the coil 74, when that current reaches a predetermined value. The over-temperature relay driver 90 includes a potentiometer 94 for setting the point at which the relay driver operates to energize the coil 74 according to the temperature of the air stream to be safe-guarded against. The coil 74, upon energization thereof, opens the switch 70, and thus opens the circuit to the heater element 14. The provision of the relay 72 and the driver 90 serves as a safeguard in the event that any malfunction should develop in the transistor 56 or any of the other elements in the train anterior thereto, preventing overheating and damage resulting therefrom.

Means is also provided for rapidly heating the air stream in the event that unusually cold conditions are encountered. The auxiliary heater element 28 is utilized for this purpose. This auxiliary heater element is connected at one side to a conductor 96 which leads through conductor 68 and associated elements to the lead-in conductor 36; on the other side it is connected to a conductor 98 and a conductor 99 in which is a normally open switch 100, the switch being connected on the other side to conductors 82 and 84 and through the conductor 86 to the opposite lead-in conductor 38.

The switch 100 is incorporated in a relay 102 which includes a coil 104 (center left) incorporated in the under-temperature control means 32. This means 32 includes an under-temperature relay driver 106, which is an amplifying means of known kind, and incorporated in the circuit similarly to the over-temperature relay driver 90 so as to be controlled by the signals produced by the sensing element 22. These signals are transmitted through the bridge amplifier 40 to the relay driver or amplifying means 106. The signal imposed on the relay driver 106 is the result of the action of the bridge amplifier 40 due to an imbalance therein caused by the signals produced by the sensing element 22. The signals thus developed in the relay driver 106 in the final stage thereof constituted by the transistor 108 are imposed on the coil 104. The coil, when thus energized, closes the switch 100, and puts the auxiliary heater element 28 in circuit. The relay driver 106 is adjusted by means of a potentiometer 110, so as to render the relay driver operative for closing the switch 100 below a predetermined temperature of the air stream. When the temperature of the air stream then reaches that predetermined temperature, the relay 102 is deenergized, the switch 100 is opened and the auxiliary heater element 28 is cut out.

Obviously, numerous modifications and variations of the present invention are possible in the light of the above teachings. It is therefore to be understood that within the scope of the appended claims, the invention may be practiced otherwise than as is specifically described.

What is claimed is:

1. Apparatus for controllably heating a stream of fluid flowing through a conduit, comprising a main heater element in said conduit of predetermined capacity for generating heat, means for transmitting heating medium to said main heater element, control means for controlling heat generation by said main heater element, said control means having heat sink means in said conduit, and said heat sink means being positioned upstream from said main heater element, amplifier means including heat sensing means, said heat sensing means being located in said conduit downstream from said main heater element, said heat sensing means operative for actuating said control means and thereby said heater element for heating said fluid to substantially a constant temperature.

2. Apparatus as set out in claim 1, and wherein said control means is operative for controlling said heater element throughout the range from zero to maximum capacity.

3. Apparatus for controllably heating a stream of fluid in a conduit, comprising an electrical resistance heater element in said conduit, circuit means for connecting said heater element with a source of current, control means including a heat sink member in said conduit upstream from said heater element operative for controlling flow of current to said heater element, and amplifier means including a heat sensing element, said heat sensing element being located in said conduit downstream from said heater element operative for actuating said control means for thereby controlling said heater element for maintaining a substantially constant temperature in said fluid.

4. Apparatus as set out in claim 3 and wherein said amplifier means includes a bridge circuit and said heat sensing element forms one leg of said bridge circuit, and second circuit means is provided which, responsive to an unbalanced condition in the bridge circuit, is operative for actuating said control means.

5. Apparatus as set out in claim 4 wherein said control means comprises a transistorized, multistage proportional control amplifier, arranged so that the heat generated in the transistor of its final stage is dissipated through said heat sink member in said conduit.

6. Apparatus for controllably heating a stream of fluid in a conduit, comprising a main heater element and an auxiliary heater element in said conduit, circuit means for transmitting a heating medium to said heater elements, control means including a heat sink member in said conduit upstream from said heater elements, sensing means including a heat sensitive element in said conduit downstream from said heater elements, amplifier means responsive to said sensing means operative for actuating said control means for thereby controlling said main heater element for maintaining a substantially constant temperature, and an under-temperature control responsive to said sensing means for energizing said auxiliary heater element when said fluid is below a predetermined temperature and de-energizing it when the fluid exceeds said predetermined temperature.

7. Apparatus as set out in claim 6 and including an over-temperature control responsive to said sensing means for energizing said main heater element when said fluid is below a predetermined temperature and de-energizing it above that predetermined temperature, and wherein the predetermined temperature associated with said main heater element is higher than the predetermined temperature associated with the auxiliary heater element.

8. Apparatus as set out in claim 7 and wherein both said over-temperature control and said under-temperature control are operable independently of said control means.

9. Apparatus for controllably heating a fluid stream in a conduit comprising heating means in said conduit, control means including means in said conduit upstream from said heating means operative for controlling the said heating means, said means in said conduit being operative to itself generate heat and dissipate heat into the conduit upstream from said heating means, and amplifier means including a heat sensing element, said heat sensing element being located in the conduit downstream from the heating means operative in response to temperature change in said fluid for actuating said control means and thereby controlling the heating means for maintaining a substantially constant temperature in said fluid.

10. Apparatus as set out in claim 9 wherein the said control means includes a transistorized amplifier and the said means in said conduit is one transistor amplifier stage of the amplifier.

11. Apparatus for controllably heating a stream of fluid flowing in a conduit, comprising a main heater element and an auxiliary heater element in said conduit, a bridge amplifier, said amplifier including a heat sensing element located in the conduit downstream from the said heater elements, a proportional control amplifier connected to the bridge amplifier, said proportional control amplifier including a heat sink member located in said conduit upstream from the said heater elements, said bridge amplifier being operative to furnish a control signal to said proportional control amplifier and said proportional control amplifier being further operative to control said main heater element, said heat sink member being operative to dissipate heat into said conduit, and an auxiliary heater control means for separately energizing said auxiliary heater element.

12. Apparatus as set out in claim 11 wherein said proportional control amplifier is a transistorized, multistage amplifier, and the said heat sink member dissipates the heat generated by the transistor of the final amplifier stage.

13. Apparatus as set out in claim 12 wherein said auxiliary heater control means is an under-temperature control responsive to said heat sensing element for energizing said auxiliary heater element when said fluid is below a predetermined temperature and deenergizing it when the fluid temperature exceeds said predetermined temperature.

14. Apparatus as set out in claim 13 including an over-temperature control responsive to said heat sensing element for energizing said main heater element when said fluid is below a predetermined temperature and deenergizing it above that predetermined temperature, and wherein the predetermined temperature associated with said main heater element is higher than the predetermined temperature associated with the auxiliary heater element.

15. The method of controllably heating a fluid stream in a conduit by the use of heating means and means for limiting the quantity of heat generated by the heating means, comprising the steps of introducing heat generated by the heating means into the fluid stream at a first position, introducing heat generated by the limiting means in its temperature limiting function into the fluid stream at a second position upstream from said first position, and sensing the temperature of said fluid stream downstream of said heating means and said limiting means and causing said limiting means to limit the generation of heat by said heating means when a predetermined desired temperature is reached.

16. The method as set out in claim 15 and including the step of introducing heat from an auxiliary heating means into the fluid stream while the fluid stream is below a second predetermined temperature, said second predetermined temperature being below said predetermined desired temperature.

References Cited
UNITED STATES PATENTS

| | | | |
|---|---|---|---|
| 1,515,234 | 11/1924 | Woodson | 219—364 XR |
| 1,976,367 | 10/1934 | Parsons | 219—364 XR |
| 2,165,523 | 7/1939 | Wolf | 219—364 |
| 2,492,774 | 12/1949 | Wild | 219—364 |
| 2,544,544 | 3/1951 | Qualley et al. | 219—364 |
| 2,789,200 | 4/1957 | Ebert | 219—364 |
| 2,791,670 | 5/1957 | Murphy | 219—364 XR |
| 2,805,311 | 9/1957 | Fluegel et al. | 219—483 XR |
| 3,046,380 | 7/1962 | Carlson | 219—486 XR |
| 3,079,484 | 2/1963 | Shockley | 219—501 |
| 3,280,306 | 10/1966 | Chubb | 219—501 |
| 1,937,042 | 11/1933 | Kercher | 219—364 |
| 2,838,643 | 6/1958 | Elliott et al. | |

FOREIGN PATENTS

| | | |
|---|---|---|
| 189,724 | 4/1957 | Austria. |
| 750,006 | 12/1944 | Germany. |

ANTHONY BARTIS, Primary Examiner

U.S. Cl. X.R.

219—374, 501, 486, 381, 505, 331, 308